US012779846B2

(12) United States Patent
Soeda

(10) Patent No.: US 12,779,846 B2
(45) Date of Patent: Nov. 3, 2026

(54) RECORDING ELEMENT SUBSTRATE, LIQUID DISCHARGE HEAD, AND RECORDING DEVICE

(71) Applicant: CANON KABUSHIKI KAISHA, Tokyo (JP)

(72) Inventor: Yasuhiro Soeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/965,744

(22) Filed: Dec. 2, 2024

(65) Prior Publication Data

US 2025/0178343 A1 Jun. 5, 2025

(30) Foreign Application Priority Data

Dec. 4, 2023 (JP) ................................ 2023-204335

(51) Int. Cl.
*B41J 2/045* (2006.01)

(52) U.S. Cl.
CPC ....... *B41J 2/04573* (2013.01); *B41J 2/04541* (2013.01); *B41J 2/04543* (2013.01); *B41J 2/0458* (2013.01); *B41J 2/04588* (2013.01)

(58) Field of Classification Search
CPC ......................... B41J 2/04573; B41J 2/04541; B41J 2/04543; B41J 2/0458; B41J 2/04588
See application file for complete search history.

(56) References Cited

U.S. PATENT DOCUMENTS

| | | | | |
|---|---|---|---|---|
| 7,581,797 | B2 * | 9/2009 | Kasai | B41J 2/0458 347/12 |
| 2008/0111864 | A1 * | 5/2008 | Yamaguchi | B41J 2/0452 347/59 |
| 2013/0208037 | A1 * | 8/2013 | Hirayama | B41J 2/04541 347/9 |
| 2019/0299600 | A1 * | 10/2019 | Nomura | B41J 2/04563 |
| 2022/0288924 | A1 * | 9/2022 | Nagamochi | B41J 2/0455 |

FOREIGN PATENT DOCUMENTS

| | | |
|---|---|---|
| JP | 2013176978 A | 9/2013 |

* cited by examiner

*Primary Examiner* — Henok D Legesse
(74) *Attorney, Agent, or Firm* — Canon.U.S.A., Inc. IP Division

(57) ABSTRACT

A recording element substrate includes a nozzle, an energy generating portion, a latch input terminal which inputs a latch signal, a data input terminal which inputs a data signal for controlling a drive state of the energy generating portion, a heat-pulse generation circuit which generates a heat-pulse signal determining a drive timing of the energy generating portion, a latch circuit to which the data signal is transferred from the data input terminal and which inputs the data signal at a timing when the latch signal is input, a drive element which is a drive element to which the heat-pulse signal and the data signal are transferred and which outputs a drive signal determining a drive state of the energy generating portion by a logical product of the heat-pulse signal and the data signal, and a delay circuit which delays the latch signal and inputs it to the latch circuit.

13 Claims, 10 Drawing Sheets

RECORDING ELEMENT SUBSTRATE, LIQUID DISCHARGE HEAD, AND RECORDING DEVICE

BACKGROUND

Field

This disclosure relates to a recording element substrate, a liquid discharge head including the recording element substrate, and a recording device including the liquid discharge head.

Description of the Related Art

As a recording device such as a printing device, such a configuration including a liquid discharge head in which a plurality of nozzles for discharging a liquid such as an ink droplet or the like are aligned is typical. For example, when a print job is input from an external device (a personal computer and the like), print data corresponding to the print job is transmitted to the liquid discharge head. Then, the liquid discharge head drives a recording element substrate on the basis of the transmitted print data. Then, the recording element substrate of the liquid discharge head discharges a liquid and performs a printing operation.

Japanese Patent Application Publication No. 2013-176978 discloses an art of converting serial data sent at a constant period to parallel data in relation with a circuit provided in the recording element substrate and drives a plurality of heater elements on the basis of the serial data input from the outside. Moreover, Japanese Patent Application Publication No. 2013-176978 discloses an art of transferring parallel data to a register at a timing of a latch signal and an art of driving a heater by switching a state of conduction/non-conduction of the heater on the basis of values of specific bits of the register and of a heat pulse.

In Japanese Patent Application Publication No. 2013-176978, in order to drive the conduction/non-conduction state of the heater correctly in accordance with a timing (pattern) of the heat pulse signal, an update timing of the register needs to be appropriately set with respect to the cycle of the heat pulse signal. When the value of the register is changed to negative during a period while the heat pulse signal is active, for example, the heater is brought into the non-conduction state, a time lag is generated between a pattern of the heat pulse signal and the conduction/non-conduction state of the heater, and the heater cannot be driven as intended. In a case of the recording element substrate with the configuration as above, in order to avoid the aforementioned problem, a degree of freedom in design of a switching timing of the latch signal and the switching timing of the heat pulse signal decreases, which can make restriction on the design of the recording element substrate.

SUMMARY

This disclosure relaxes the restriction on the design of the recording element substrate.

According to some embodiments, a recording element substrate which records an image by discharging a liquid toward a recording medium, includes a nozzle which discharges a liquid, an energy generating portion which generates energy for discharging a liquid from the nozzle, a latch input terminal which inputs a latch signal, a data input terminal which inputs a data signal for controlling a drive state of the energy generating portion, a heat-pulse generation circuit which generates a heat-pulse signal determining a drive timing of the energy generating portion, a latch circuit to which the data signal is input from the data input terminal and which inputs the data signal at a timing at which the latch signal is input, a drive element to which the heat-pulse signal is input from the heat-pulse generation circuit and the data signal is input from the latch circuit, the drive element outputting a drive signal determining a drive state of the energy generating portion by a logical product of the heat-pulse signal and the data signal and a delay circuit which delays the latch signal and inputs the same to the latch circuit.

According to this disclosure, restriction on the design of the recording element substrate can be relaxed.

Further features of the present disclosure will become apparent from the following description of exemplary embodiments with reference to the attached drawings.

DESCRIPTION OF THE EMBODIMENTS

Hereinafter, a description will be given, with reference to the drawings, of various exemplary embodiments (examples), features, and aspects of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

First Embodiment

Printing Device 101

Figure 1A:
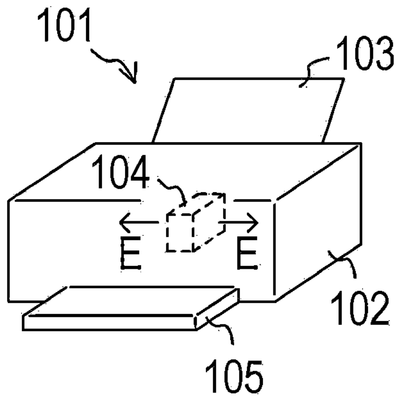
FIGS. 1A and 1B are diagrams illustrating a schematic configuration of a printing device according to a first embodiment.

First, a printing device 101 according to a first embodiment will be explained. FIG. 1A is a perspective view of the printing device 101 according to the first embodiment. The printing device 101 is a recording device including a main body portion 102, a paper feed tray 103, a print head 104, and a paper discharge tray 105.

Media, which are print targets (recording media) on which a printing operation (recording operation) is performed by the printing device 101, are stored in the paper feed tray 103 and are supplied to the main body portion 102 by the paper feed tray 103 in association with the printing operation. In the main body portion 102, the media are conveyed to the paper discharge tray 105 with determined time and speed pattern. At this time, when the print head 104 incorporated in the main body portion 102 applies a droplet (ink) on the media at an appropriate timing while reciprocally moving in a direction of an arrow E orthogonal to a conveyance direction of the media, whereby the printing operation is performed. The media for which the printing has been completed is conveyed to the paper discharge tray 105, whereby the printing operation is completed.

The printing device 101 according to the first embodiment is a printer generally called a serial-head type, and this disclosure can be also applied to a recording device such as a line-head type printer or the like, for example. In the line-head type printer, the print head is substantially fixed to the main body portion of the printing device and is different from the serial-head type printer in a point that the printing operation is not accompanied by reciprocating movement of the head.

Figure 1B:
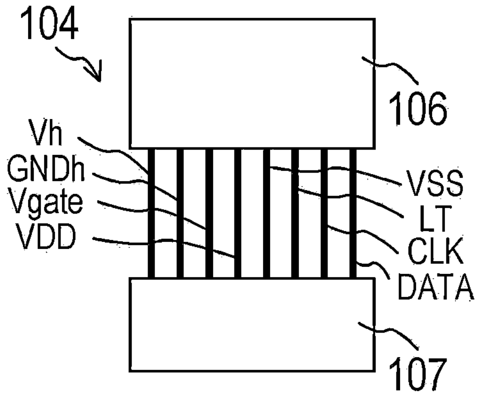

FIG. 1B is a block diagram illustrating a circuit configuration inside the print head 104. The print head 104 is a liquid discharge head including a head substrate 106 and a recording element substrate 107 which discharges the liquid to the media and records an image. The head substrate 106 and the recording element substrate 107 are connected to each other by a signal wiring and a power-supply wiring, and power supply and signals are supplied from the head substrate 106 side to the recording element substrate 107. The power supply (potential) supplied from the head substrate 106 to the recording element substrate 107 includes a power supply Vh, a reference potential GNDh, a power supply Vgate, a power supply VDD, and a reference potential VSS. Moreover, the signals supplied from the head substrate 106 to the recording element substrate 107 include a signal LT as a latch signal, a signal CLK as a clock signal, and a signal DATA as a data signal.

The power supply Vh is a heater power supply for causing a droplet in the recording element substrate 107 to be discharged and is a power supply of 24V to 32V, for example. The reference potential GNDh supplies a reference potential of the power supply Vh. The power supply Vgate is a gate power supply of a transistor element for driving the heater and is a power supply of 5V, for example. The power supply VDD is a power supply for causing a drive circuit in the recording element substrate to be operated and is a power supply of 3.3V, for example. The reference potential VSS is a reference potential of the power supply Vgate and the power supply VDD.

The signal LT, the signal CLK, and the signal DATA are signals for controlling an operation of the recording element substrate 107 and an operation timing. In FIG. 1B, the aforementioned power supplies and signals are illustrated by a single wiring, respectively, but for a power-supply wiring, for example, the same type of wirings may be provided in plural for the purpose of ensuring capacity of an electric current.

Recording Element Substrate 107

Subsequently, with reference to FIGS. 2A to 2D, a configuration of the recording element substrate 107 will be explained. In constituent elements of the recording element substrate 107, disposition of a circuit and an element, a structure of the element, and operation principles of the element will be explained particularly in detail.

Figures 2A, 2B, 2C, 2D:
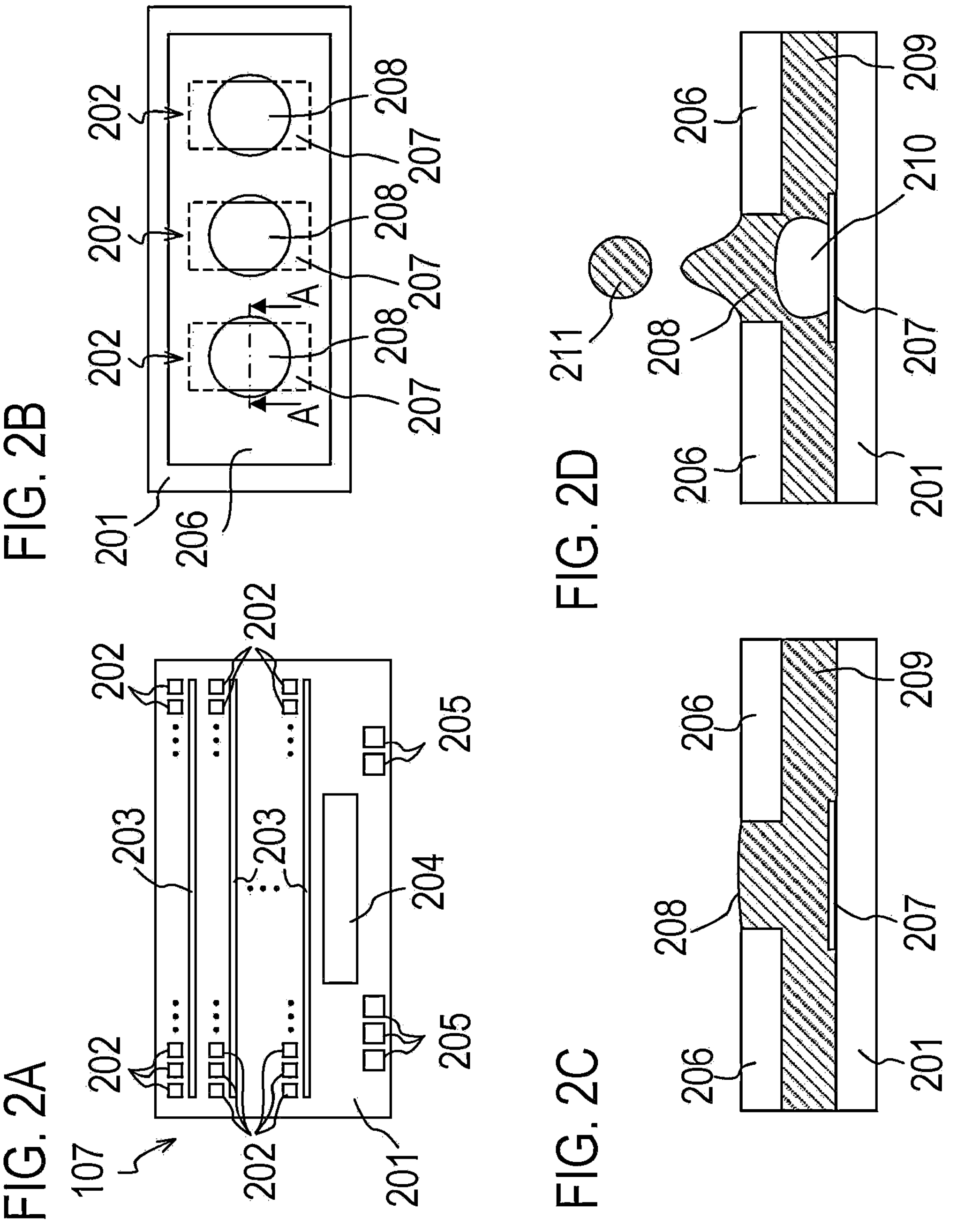
FIGS. 2A to 2D are diagrams illustrating a schematic configuration of a recording element substrate according to the first embodiment.

FIG. 2A is an explanatory diagram illustrating a circuit of the recording element substrate 107 and disposed positions of the elements. An element substrate 201 is a basic structural body constituting the recording element substrate 107. The circuit and the element formed on the recording element substrate 107 are formed on the element substrate 201. On the element substrate 201, a discharge element 202, a column circuit 203, an end-portion circuit 204, a pad 205 and the like are provided.

The discharge element 202 is an element which discharges a droplet required for the printing operation. Though details will be described later, the discharge element 202 is constituted by one heater and one nozzle and forms a smallest element of a discharge function. The discharge elements 202 are formed in plural on the element substrate 201 and are disposed in an array state (column state). Hereinafter, a group of array arrangement in a lateral direction in FIG. 2A will be explained as a column.

The column circuit 203 is disposed so as to follow a column of the discharge elements 202. The column circuit 203 includes a drive element for driving the discharge element 202 and a circuit element attached thereto. The end-portion circuit 204 includes a signal generation circuit for controlling the recording element substrate 107. To the pad 205, a signal for connecting the power supply (potential) and a control signal to the recording element substrate 107 is connected.

FIG. 2B is a top view for explaining the structure of the discharge element 202 and illustrates three pieces of the discharge elements 202. FIG. 2C is an A-A sectional view of FIG. 2B. The element substrate 201 and a top plate 206 are disposed by opposing each other with a certain space between them in a direction perpendicular to a paper surface of FIG. 2B. One piece of the discharge element 202 includes the heater 207 and the nozzle 208 one each. The heater 207 is formed on the element substrate 201, and an electric current is supplied thereto by a drive circuit, not shown. The nozzle 208 is an opening provided in the top plate 206, and when viewed in an opposing direction of the element substrate 201 and the top plate 206, it is disposed at a position overlapping the heater 207. In a space formed by the element substrate 201 including an inside of the nozzle 208 and the top plate 206, a liquid 209 is supplied from a droplet supply path, not shown. Then, the space is filled with the liquid 209.

FIG. 2D is a diagram for explaining the operation principle of the discharge element 202 and illustrates a state where a droplet 211 is discharged from the nozzle 208 on the A-A section in FIG. 2B. As described above, the electric current is supplied to the heater 207, the heater 207 generates heat by the electric current, and a foaming portion 210 is formed on an upper portion of the heater 207. The liquid 209 filled in the periphery of the foaming portion 210 is pushed out to the vicinity of the nozzle 208, and a part thereof is discharged to an outside of the recording element substrate 107 and forms the droplet 211. The droplet 211 is then reaches the media and forms an image. That is, the heaters 207 in the same number as that of the nozzles 208 constitute an energy generating portion which generates energy for discharging the droplet 211 (liquid 209) from the nozzle 208.

Circuit Configuration of Recording Element Substrate 107

Figure 3:
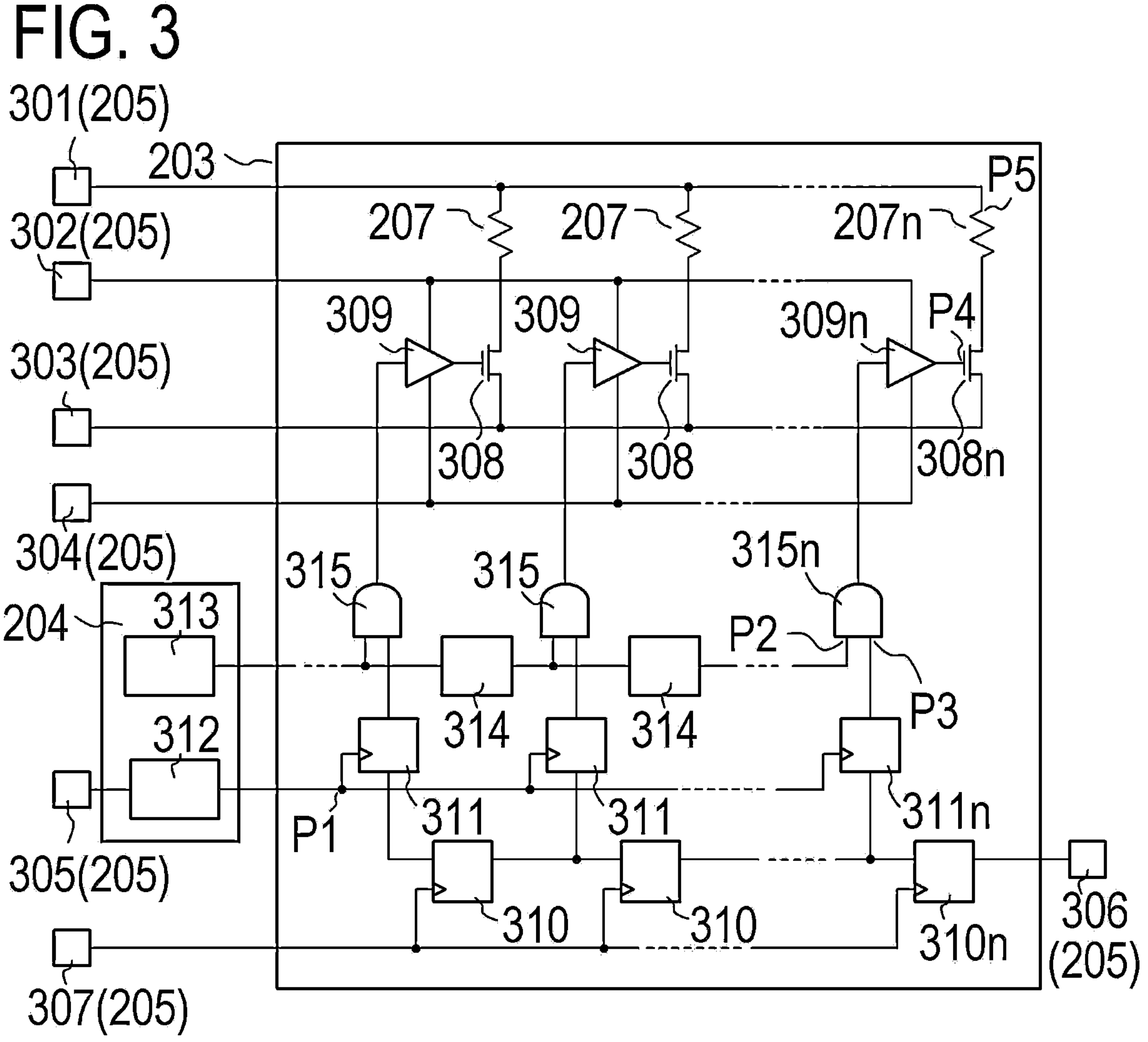
FIG. 3 is a diagram illustrating a configuration of a circuit of the recording element substrate according to the first embodiment.

Subsequently, with reference to FIG. 3, a circuit formed on the recording element substrate 107 will be explained. FIG. 3 is a diagram illustrating a configuration of a circuit of the recording element substrate 107. In FIG. 3, a configuration having n pieces of the discharge elements 202, that is, n pieces of the heaters 207 is illustrated as an example.

The heater 207 is equivalent to a resistive element. In FIG. 3, three pieces of the heaters 207 and their drive circuits are illustrated. Hereinafter, the one shown on the right side in FIG. 3 among the three pieces of the heaters 207 is assumed to be a heater 207*n*, and by appropriately giving n to an element corresponding to the heater 207*n*, explanation will be made distinctively as necessary.

One of terminals of the heater 207 is connected to a Vh pad 301 (205). Here, (205) is added after the sign of the pad because the Vh pad 301 is one of pads 205 in FIG. 2A. Each of a Vgate pad 302, a GNDh pad 303, a pad 304, a pad 305, a pad 306, and a pad 307, which will be explained below, is also one of the pads 205, and (205) is added after the sign in FIG. 3. In the following explanation, the added part is omitted for simplification of notation.

The other terminal of the heater 207 is connected to a transistor 308. The transistor 308 is configured capable of a switching operation for switching between a conductive state where the heater 207 and the GNDh pad 303 are conducted and a non-conductive state without conduction in accordance with a potential of a terminal P4, which is a gate terminal. More specifically, the heater 207 and the GNDh pad 303 are brought into the non-conductive state when the terminal P4 is in the vicinity of the reference potential VSS, while they are brought into the conductive state when the terminal P4 is in the vicinity of the same potential (5 V) as that of the Vgate pad 302. In the conductive state, a heater current flows from the Vh pad 301 to the GNDh pad 303 in the heater 207.

The pad 306 is a data input terminal of serial data D as a data signal, and the pad 307 is a clock input terminal of a signal CLK. The serial data D input from the pad 306 is synchronized with a rising edge and a falling edge of the signal CLK and input. This serial data D is similar to the signal DATA in FIGS. 1A and 1B. In a shift register 310, at timings of the rising edge and the falling edge of the signal CLK, the serial data D is shifted by 1 bit to the left direction in FIG. 3.

A terminal on an output side of the shift register 310 is connected to a register 311. To the register 311, the pad 305, which is a latch input terminal to which the signal LT is input, is connected via a delay element 312 disposed in the end-portion circuit 204. At a timing when the rising edge of the signal LT delayed by the delay element 312 reaches the register 311, a value of the shift register 310 is copied to the register 311. In the following, this copying operation is expressed as "update of a register value". In other words, to the shift register 310, the signal CLK and the serial data D are transferred, and the shift register 310 is synchronized with the signal CLK and transfers the serial data D to the register 311. Then, the register 311, which is a latch circuit, transfers the copied value (serial data D) of the shift register 310 at the timing when the signal LT was transferred.

In the end-portion circuit 204, a heat-pulse generation circuit 313 is provided in addition to the delay element 312. The heat-pulse generation circuit 313 is connected to a plurality of AND elements 315, and a generated heat-pulse signal (hereinafter, described as a signal HE) is transferred to the AND element 315. The signal HE is a signal which determines a drive timing of the heater 207. In a wiring path from the heat-pulse generation circuit 313 to the AND elements 315, heat delay elements 314 are disposed in a distributed manner, and the signal HE reaches from the left side in the drawing to the AND elements 315 on the right side while increasing the delay. By means of the configuration as above, the signal HE is transferred to the plurality of AND elements 315 at timings different from one another.

Figure 5:
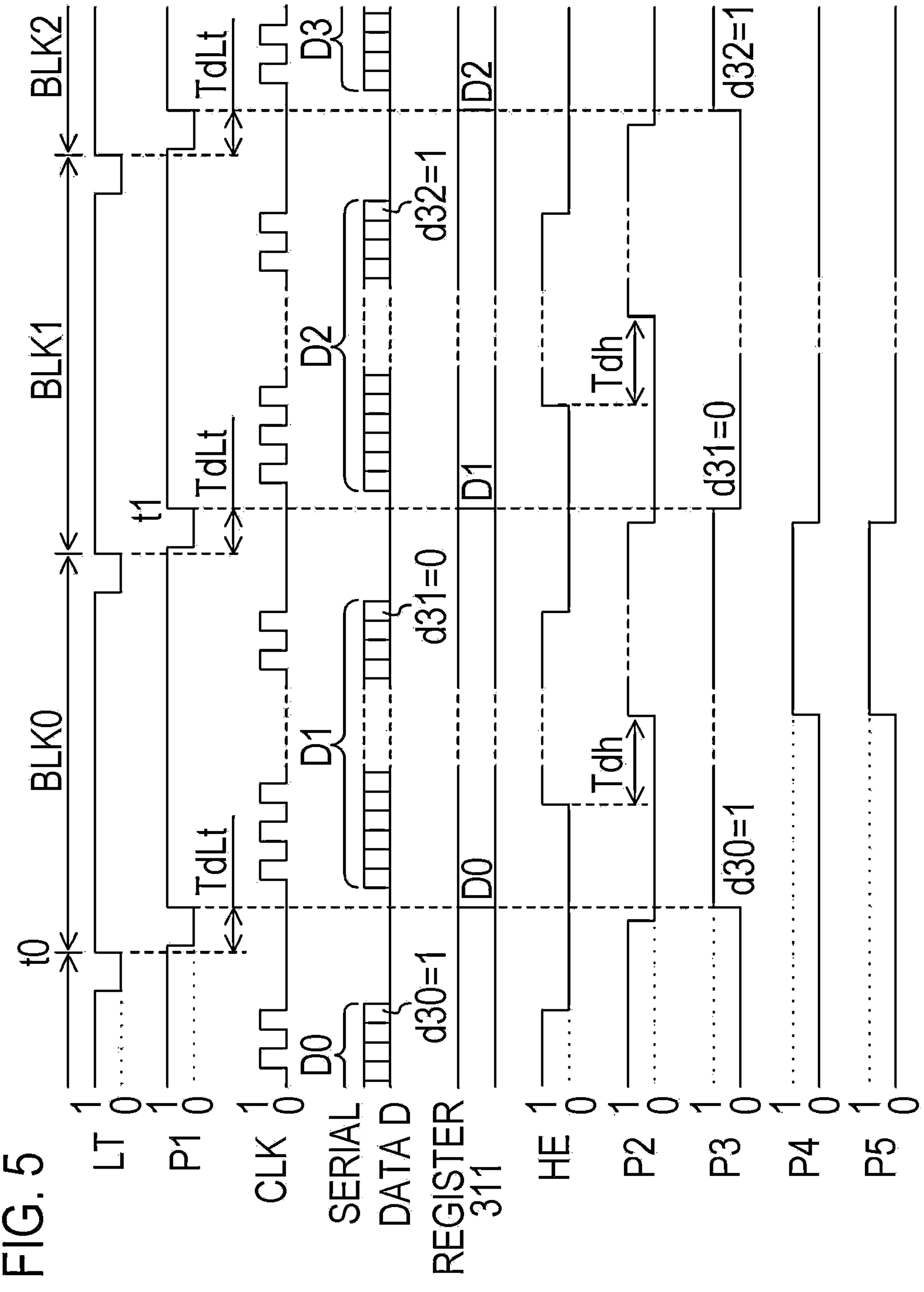
FIG. 5 is a timing chart illustrating an operation of the recording element substrate according to the first embodiment.

Though details will be described later with reference to FIG. 5, when the signal HE input into a terminal P2 of the AND element 315 and a value of the register 311 input into a terminal P3 are both active (3.3V), a voltage of 3.3V is input into a level converter 309 by the AND element 315. At this time, the terminal P4 of the transistor 308 becomes close to 5V, and the transistor 308 is brought into the conductive state. That is, the AND element 315 is a drive element which outputs a drive signal determining a drive state of the heater 207 by a logical product of the signal HE and the serial data D.

The level converter 309 is provided between the transistor 308 and the AND element 315. The level converter 309 has an effect of making conductive resistance (ON resistance) of the transistor 308 smaller by raising the voltage of the terminal P4 of the transistor 308.

Circuit Configuration of Delay Element 312

Figure 4:
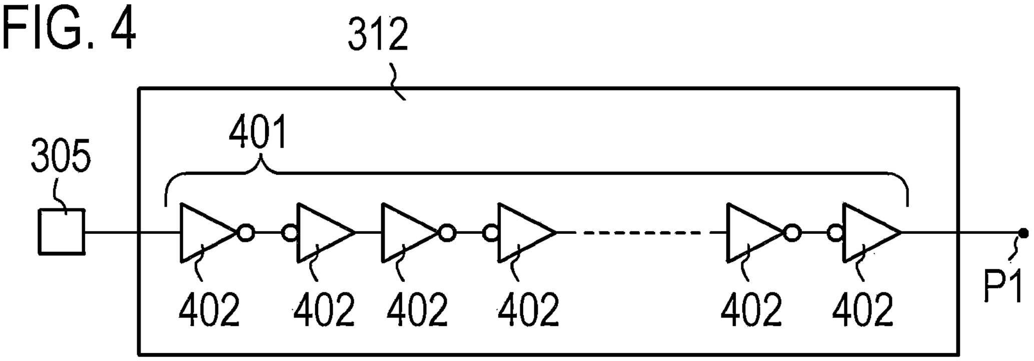
FIG. 4 is a diagram illustrating a configuration of a circuit of a delay element according to the first embodiment.

Subsequently, with reference to FIG. 4, a circuit configuration of the delay element 312 will be explained. FIG. 4 is a circuit diagram for explaining the configuration of the delay element 312. The delay element 312 is a delay circuit including a delay element 401 constituted by connecting a plurality of inverters 402 in series. In FIG. 4, two types of circuit symbols are used as the inverters 402, which are inverter elements, but since the circuits are the same, the same name and sign are given to the respective circuit symbols. The signal LT input from the pad 305 requires limited time for signal propagation between input/output of the inverters 402 input into an initial stage of the inverter 402, and by combining them in serial in multiple stages, desired delay time is obtained. An output of the delay element 312 is connected to a terminal P1.

Operation of Recording Element Substrate 107

Subsequently, with reference to FIG. 5, an operation of the recording element substrate 107 will be explained. FIG. 5 is a timing chart illustrating the operation of the recording element substrate 107. In the first embodiment, the heater 207 is driven by BLK drive. In the BLK drive, such time-division drive is performed that the heaters 207 are grouped in advance in terms of an electric circuit (BLK division), and the drive of each BLK is allocated in 1-column cycle (cycle in which all the heaters 207 on the recording element substrate 107 can be driven once). As a specific example, the 1-column cycle is approximately 42 microseconds and corresponds to 24 kHz in a frequency. For example, in the 16 time-division drive in which one session of the drive of the heater 207 is divided into 16 groups, the period BLK subjected to the BLK division is an approximately sixteenth part of 1 column and 2 to 3 microseconds.

Each of the respective periods (sections) of the rising edge reference of the signal LT is assumed to be the period BLK. That is, a period from the rising edge of the signal LT to the subsequent rising edge of the rising edge concerned is assumed to be the period BLK. Hereinafter, as shown in FIG. 5, when the plurality of periods BLK will be explained distinctively, a numeral is given to each period BLK. Regarding the period BLK, a start point of a cyclic operation of the recording element substrate 107 is defined. A series of operations of the recording element substrate 107 in each cycle will be explained as an operation in one period BLK. In FIG. 5, as an example, operations of a period BLK0, a period BLK1 after the period BLK0, a period BLK2 after the period BLK1 are illustrated.

Hereinafter, with reference to FIG. 5, with the heater 207*n* provided on the right end in FIG. 3 as an example, the operation of the recording element substrate 107 will be explained. Note that the heater 207 other than the heater 207*n* is driven similarly. In FIG. 5, states of the signal LT, the signal HE, and signals input into the terminals P1 to P5 are illustrated, and when each signal is active, it is indicated as 1, while when it is non-active, it is indicated as 0. Moreover, FIG. 5 illustrates states of the signal CLK, the serial data D, and the register 311.

When the recording element substrate 107 is driven, subsequent to the rise of the signal LT at time t0, the signal CLK and the serial data D are input. Hereinafter, a set of the serial data D input in the period BLK0 is noted as serial data D1. Similarly, it is noted such that the one input in the period BLK1 as serial data D2, the one input in the period BLK2 as serial data D3, and the one input in the period BLK immediately before the period BLK1 as serial data D0.

The serial data D1 includes data d31. The data d31 determines a value of the terminal P3, which is an input terminal of an AND element 315*n* shown in FIG. 3. Note that the data array in the serial data D1 explained here is an example for explanation and the other arrays can be adopted. Similarly, the serial data DO includes data d30, and the serial data D2 includes data d32.

In the period BLK0, data of all the shift registers 310 is finalized after the data d31 is input. After the data of the shift register 310 is finalized, input of the signal CLK is stopped. When the signal CLK is stopped, update preparation of the register 311 is completed.

The update timing of the register 311*n* is a signal rising timing of the terminal P1 after delay time TdLt has elapsed since the rise of the signal LT. When the signal of the terminal P1 rises at time t1, the register 311*n* is updated, and the value of the register 311*n* is changed from the serial data DO to the serial data D1. By means of the configuration as above, the serial data D is transferred from the register 311 to the AND element 315 when the signal HE is 0 (non-active).

In the period BLK0, the data d31 is input lastly in the serial data D1. Therefore, the value of the data d31 is held in a shift register 310*n*, which is closest to the input side. When the register 311 is updated at the time t1, the data d31 is transferred to the register 311*n* which determines the value of the terminal P3 of the period BLK1. From such relation that the value of the register 311 in a period BLK is determined by the serial data D of the BLK period before that, the data d30 of the serial data D0 determines the state of the terminal P3 of the period BLK0. Similarly, the serial data D1 determines the state of the terminal P3 of the period BLK1, and the serial data D2 determines the state of the terminal P3 of the period BLK2. FIG. 5 illustrates examples of d30=1 (active), d31=0 (non-active), and d32=1 (active). At this time, the state of the terminal P3 changes to 1 (active) in the BLK0, to 0 (non-active) in the BLK1, and 1 (active) in the BLK2.

As described above, the signal HE is generated in the heat-pulse generation circuit 313 and is propagated to the plurality of AND elements 315 while passing through the plurality of heat delay elements 314. In the propagation path of the signal HE, to the terminal P2 of the AND element 315*n*, which is disposed at the farthest from the heat-pulse generation circuit 313, the signal HE having passed through the largest number of heat delay elements 314 is propagated. Thus, the delay time of the signal HE propagated to the terminal P2 of the AND element 315*n* is the largest, and its delay time is time Tdh.

A conduction operation of the heater 207 will be explained with the electric current of the terminal P5 of the heater 207*n* as an example. As described above, the heater 207*n* becomes conductive when the states of the terminal P2, the terminal P3 of the AND element 315*n* are both active (3.3V in the circuit diagram, 1 in the timing chart). Thus, in the period BLK0, for example, the electric current flows through the terminal P5 only during a period when the terminal P3 is active at a timing when the terminal P2 is active, that is, at the timing when the delayed signal HE is 1.

The signal input into the terminal P3 has a function of selecting driving or not driving on the basis of the signal HE depending on the state and thus, it can be reworded to a heater selection signal. In order to normally perform the printing operation of the recording element substrate 107, the selected heater 207 needs to be loyally driven correspondingly to a state change of the signal HE. Particularly, due to a recent request for the printing operation of the printing device at a higher speed, an update timing cycle of the register or a state switching cycle of conduction/non-conduction of the heater tends to be set shorter. That is, the printing operation at a higher speed increases a concern of a shift between the pattern of the signal HE and the conductive/non-conductive state of the heater. In the first embodiment, the signal input into the terminal P3 is data d3k (k=0, 1, 2, . . . ) updated at a signal LT timing delayed by the delay element 312. By means of the configuration as above, when occurrence of the shift is to be prevented, restriction on design of the timing of the signal LT and the timing of the signal HE is relaxed. Hereinafter, the operation of the recording element substrate 107 of the first embodiment will be explained in more detail while comparing it with an operation of a comparative example.

Figure 6:
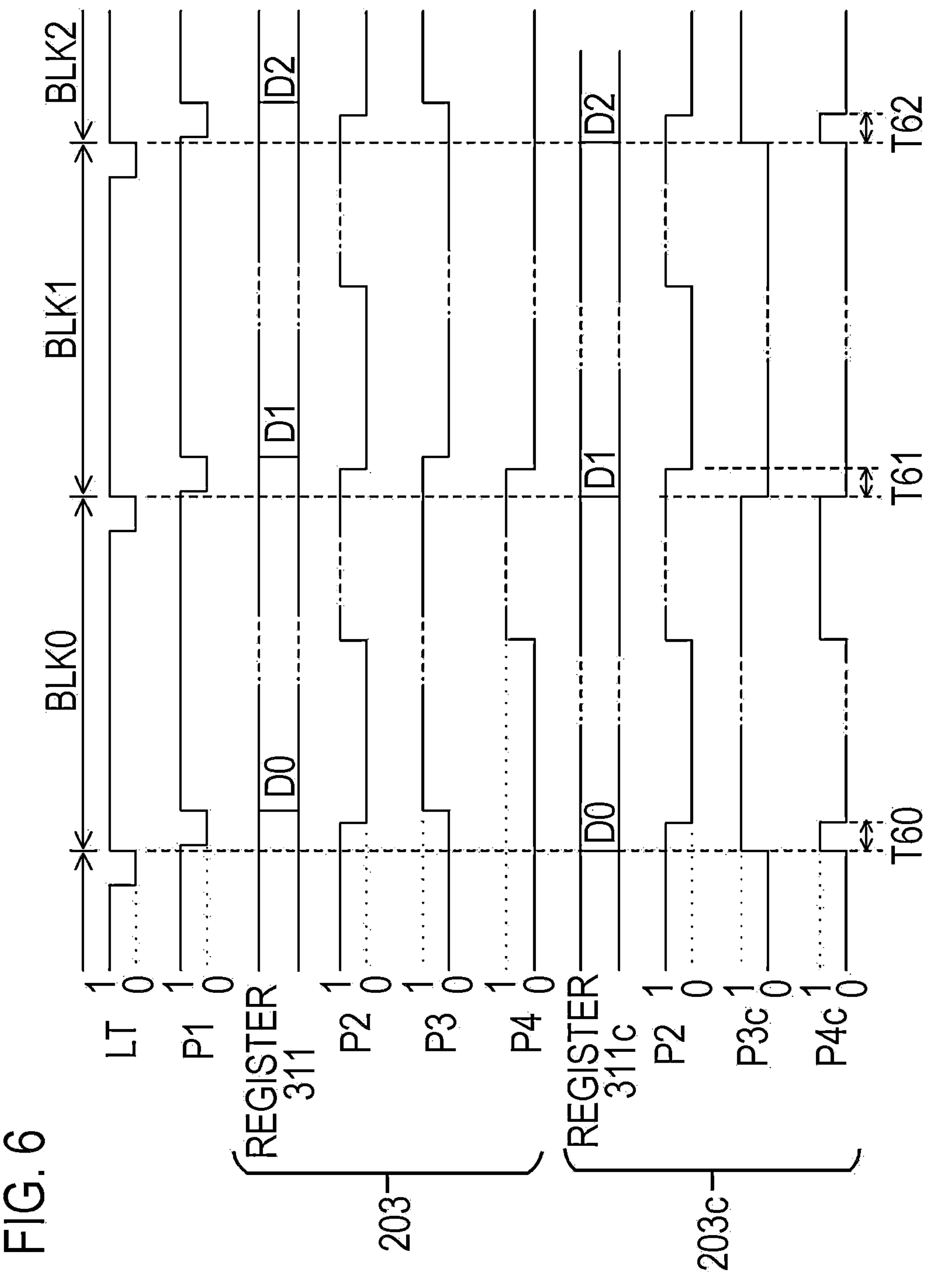
FIG. 6 is a timing chart illustrating an operation of the recording element substrate according to the first embodiment and a comparative example.

Subsequently, with reference to FIG. 6, the operations of the recording element substrates 107 in the first embodiment and the comparative example will be explained while comparing them. FIG. 6 is a timing chart for explaining the operations of the first embodiment and the comparative example. In FIG. 6, as signals related to the column circuit 203 of the first embodiment, the signals input into the terminal P2, the terminal P3, and the terminal P4 and the state of the register 311 are illustrated. Moreover, in FIG. 6, as signals related to the column circuit 203*c* (not shown) in the comparative example, signals input into the terminal P2, a terminal P3c, and a terminal P4c and the state of a register 311*c* are illustrated. That is, in the first embodiment and the comparative example, the signals input into the terminal P2 show a similar behavior. Moreover, the signal LT and the signal input into the terminal P1 also show a similar behavior. Furthermore, the serial data D in each period BLK is similar to that shown in FIG. 5.

The register 311*c* indicates a temporal change of the register 311 when the signal LT is input without through the delay element 312. When the signal LT is not delayed, the timing of the rise of the signal LT becomes update timing of the register 311*c*. Then, at that timing, the value of the register 311*c* changes from the serial data D0 to the serial data D1, and from the serial data D1 to the serial data D2.

Then, with the change of the value of the register 311*c*, the state of the terminal P3c changes at the rising timing of the signal LT.

At this time, the terminal P4c whose state is changed synchronously with the output of the AND element 315*n* has a waveform as shown in FIG. 6. In FIG. 6, from a timing when the signal input into the terminal P3c becomes active to a timing when the signal input into the terminal P2 becomes non-active are shown as sections T60, T61, and T62. The section T60 is a section of the period BLK0, the section T61 is a section of the period BLK1, and the section T62 is a section of the period BLK2.

In the comparative example, in the section T60 and the section T62, the input signal of the terminal P3c rises before the input signal of the terminal P2 (delayed signal HE) rises, and the input signal of the terminal P4c switches to the 1 (active) state. On the other hand, in the section T61, the input signal of the terminal P3c falls before the input signal of the terminal P2 falls, and the input signal of the terminal P4c is brought into the 0 (non-active) state. Therefore, in the section T60, the section T61, and the section T62, the heater 207 does not change synchronously with the state change of the signal HE input into the terminal P2. Such a situation should be avoided since the heater 207 cannot be driven as intended. Moreover, the larger the delay of the signal HE is, the more notably the problem as above can occur.

On the other hand, in the first embodiment, the input signal of the terminal P3 is delayed by the delay element 312 and is input. In addition, in each period BLK, the rise of the input signal of the terminal P3 is earlier than the rise of the input signal of the terminal P2, and the fall of the input signal of the terminal P3 is slower than the fall of the input signal of the terminal P2. In addition, the state of the input signal of the terminal P4, which is an output of the AND element 315*n*, is changed synchronously with the input signal of the terminal P2. As described above, in the first embodiment, the timing of the signal HE and the register update timing can be set appropriately by the delay of the update timing of the register 311. Furthermore, in all the heaters 207, occurrence of the aforementioned problem can be suppressed.

As described above, according to the configuration of the first embodiment, the relation between the timing of the LT signal and the register update timing can be adjusted by delay time of the LT signal, whereby direct timing restriction between the LT signal and the HE pulse can be relaxed. As a result, a degree of freedom in design of the HE pulse and the LT timing increases, whereby the restriction on the design of the recording element substrate can be relaxed.

Note that, in this embodiment, the example in which the discharge element 202 is constituted by the heater 207 was explained, but in a case where it is constituted by a piezo element, too, the similar problem is expected, and the similar effect can be obtained by this disclosure.

Second Embodiment

Subsequently, a second embodiment according to this disclosure will be explained. The second embodiment is different from the first embodiment in the configuration of the delay element which delays the signal LT. Hereinafter, in the configuration of the second embodiment, only a point different from the configuration of the first embodiment will be explained, and the same signs are given to those similar to the configurations in the first embodiment, and explanation will be omitted.

Circuit Configuration of Recording Element Substrate 107

Figure 7:
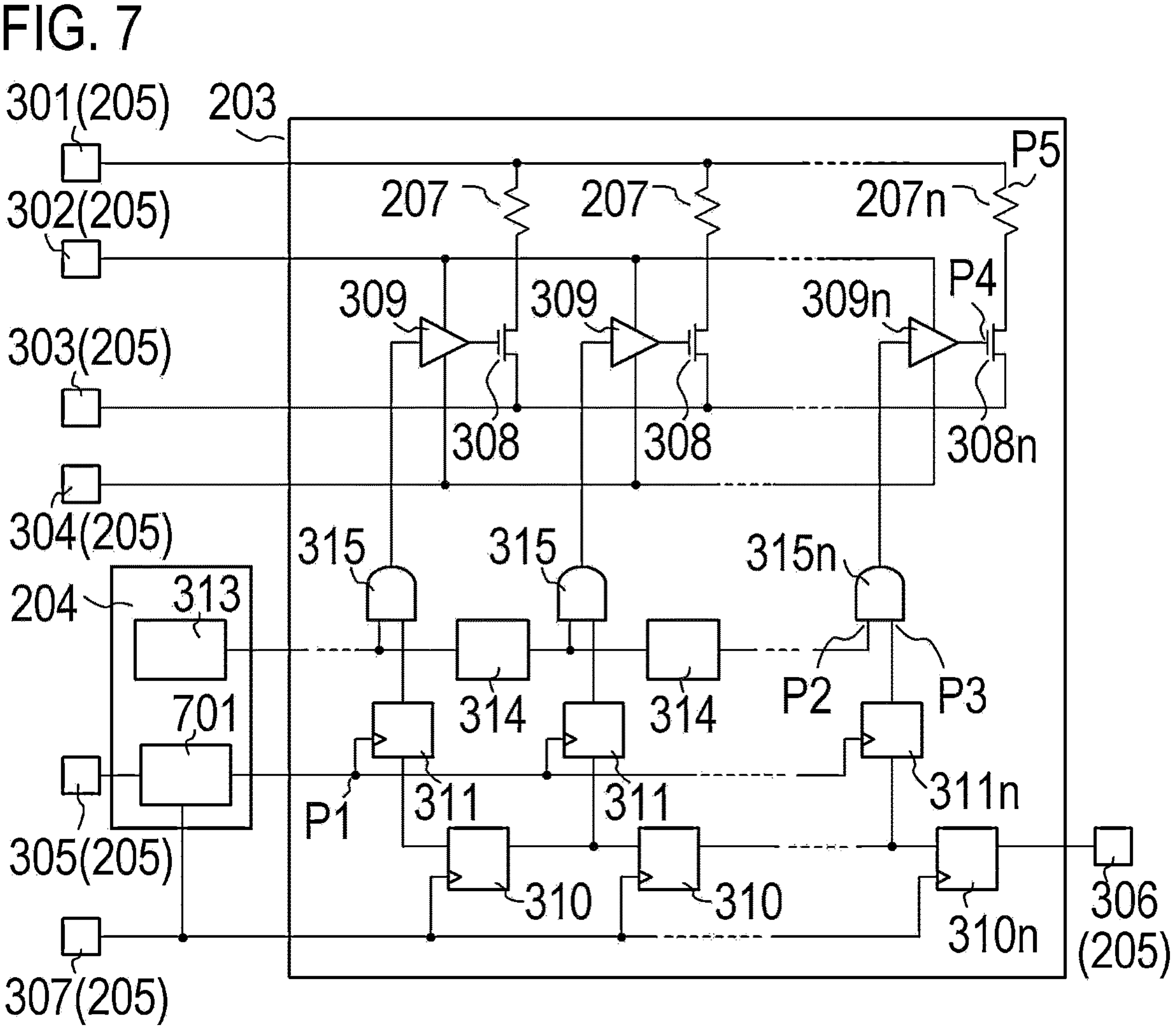
FIG. 7 is a diagram illustrating a configuration of a circuit of a recording element substrate according to a second embodiment.

With reference to FIG. 7, a circuit formed on the recording element substrate 107 according to the second embodiment will be explained. FIG. 7 is a diagram illustrating a configuration of the circuit of the recording element substrate 107 according to the second embodiment. Hereinafter, regarding the circuit configuration of the recording element substrate 107 according to the second embodiment, a difference from the circuit according to the first embodiment shown in FIG. 3 will be explained.

In the end-portion circuit 204 of the recording element substrate 107 according to the second embodiment, in addition to the heat-pulse generation circuit 313, a delay element 701 is provided. The signal LT input from the pad 305 is input into the delay element 701. Moreover, to the delay element 701, the signal CLK of the pad 307 is input, and an output of the delay element 701 is connected to the terminal P1.

Delay Element 701

Figure 8A:
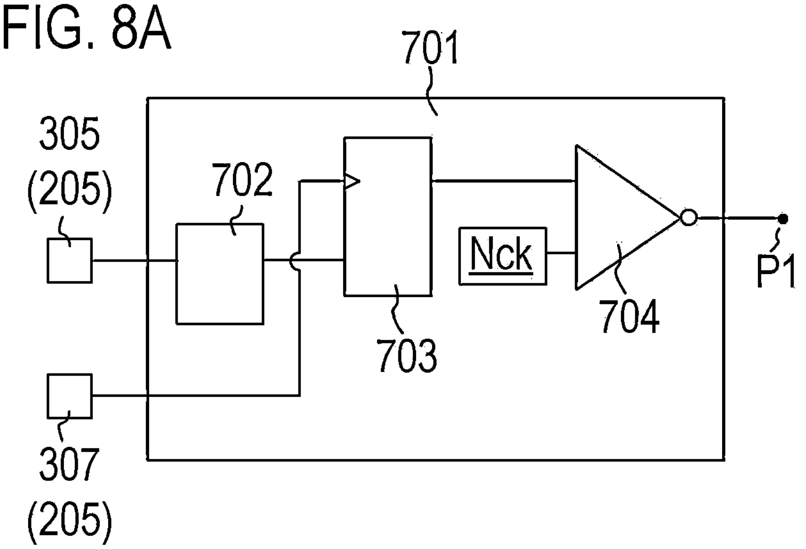
FIGS. 8A and 8B are diagrams illustrating a configuration and an operation of a circuit of a delay element according to the second embodiment.
Figure 8B:
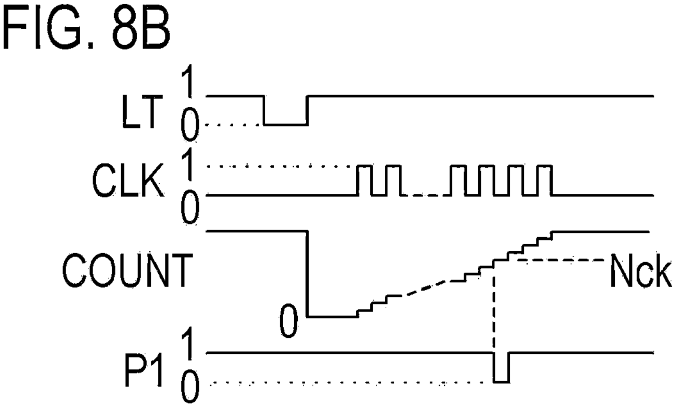

Subsequently, with reference to FIGS. 8A and 8B, a configuration and an operation of the delay element 701 will be explained. FIG. 8A is an explanatory diagram of a circuit configuration of the delay element 701. FIG. 8B is an explanatory view of the operation of the delay element 701.

The delay element 701 is a delay circuit including an edge detection circuit 702, a counter 703, a numeral-value comparator 704, and a constant Nck. Regarding the signal LT input from the pad 305, the rise of the signal LT is detected by the edge detection circuit 702. The rise of the signal LT is input into the counter 703 and is used as a reset signal of the counter 703.

Into the counter 703, the signal CLK of the pad 307 is input. The counter 703 increases a count value by one each time the rise or the fall of the signal CLK is input. The counter 703 is constituted by a plurality of flip-flop circuits, for example.

The numeral-value comparator 704 compares the value of the counter 703 with the numeral value Nck and outputs the state 1, if the respective values do not match each other, while it outputs the state 0, if they match. The numeral-value comparator 704 is connected to the terminal P1, and the output of the numeral-value comparator 704 is input into the terminal P1.

By means of the configuration as above, in the second embodiment, the delay element 701 is constituted as a logic circuit whose output state is changed with the signal LT and the signal CLK as inputs. The signal input into the terminal P1 is used as an update signal of the register 311. That is, in the second embodiment, the value of the register 311 is updated with the signal CLK as a trigger.

As described above, in the configuration of the second embodiment, too, the relation between the timing of the LT signal and the register update timing can be adjusted by the delay time of the LT signal, and the direct timing restriction of the LT signal and the HE pulse can be relaxed. As a result, the degree of freedom in design of the HE pulse and the LT timing increases, whereby the restriction on the design of the recording element substrate can be relaxed.

The heat-pulse generation circuit 313 of the end-portion circuit 204 is constituted by using a digital circuit in general. Therefore, in the second embodiment in which the delay element 701 is constituted by the digital circuit, the end-portion circuit 204 including the heat-pulse generation circuit 313 and the delay element 701 can be constituted by one technology. Moreover, in the second embodiment, by changing the numeral value Nck, delay time TdLt of the signal LT can be easily adjusted.

Note that, in the second embodiment, the circuit of the delay element 701 is constituted by including a counter circuit, but it may be constituted so as to include a flip-flop circuit with the signal CLK as an update signal. Moreover, in the second embodiment, the numeral value Nck is incorporated in the delay element 701, but this constitution is not limiting. For example, the numeral value Nck may be incorporated in a part of the serial data D so that it can be set from an outside of the recording element substrate 107.

Third Embodiment

Subsequently, a third embodiment according to this disclosure will be explained. The third embodiment is different from the first embodiment in the configuration of the delay element which delays the signal LT. Hereinafter, in the configuration of the third embodiment, only a point different from the configuration of the first embodiment will be explained. In the configuration of the third embodiment, the same signs are given to those similar to the configurations of the first embodiment, and explanation will be omitted.

Circuit Configuration of Recording Element Substrate 107

Figure 9:
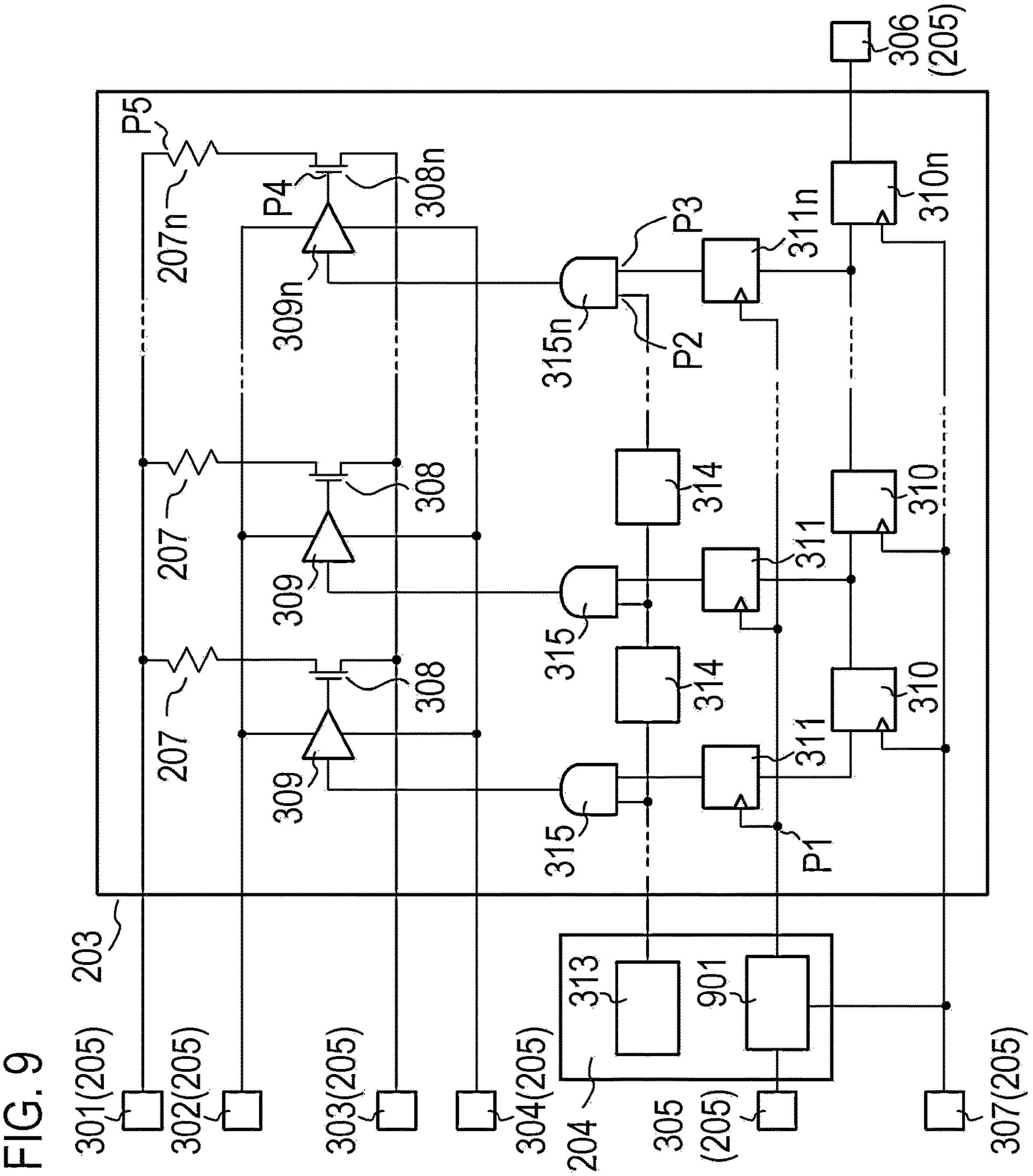
FIG. 9 is a diagram illustrating a configuration of a circuit of a recording element substrate according to a third embodiment.

With reference to FIG. 9, a circuit formed on the recording element substrate 107 according to the third embodiment will be explained. FIG. 9 is a diagram illustrating a configuration of the circuit of the recording element substrate 107 according to the third embodiment. Hereinafter, regarding the circuit configuration of the recording element substrate 107 according to the third embodiment, a difference from the circuit according to the first embodiment shown in FIG. 3 will be explained.

In the end-portion circuit 204 of the recording element substrate 107 according to the third embodiment, in addition to the heat-pulse generation circuit 313, a delay element 901 is provided. The signal LT input from the pad 305 is input into the delay element 901. Moreover, to the delay element 901, the signal CLK of the pad 307 is input, and an output of the delay element 901 is connected to the terminal P1.

Delay Element 901

Figure 10A:
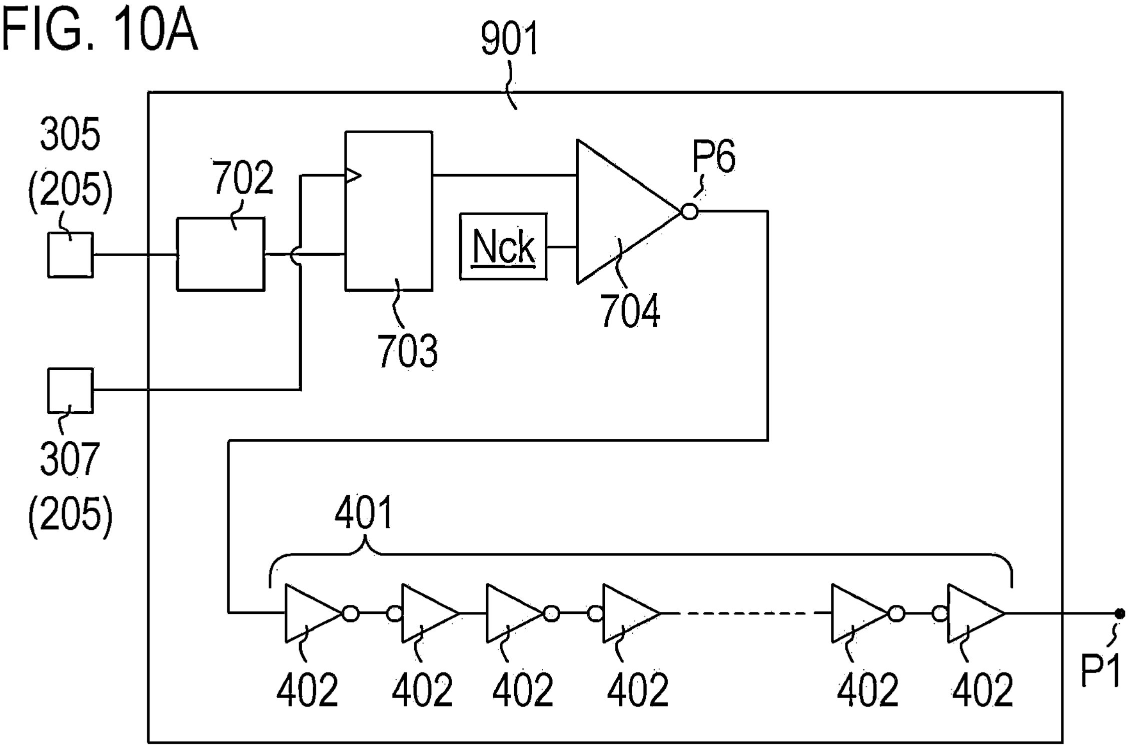
FIGS. 10A and 10B are diagrams illustrating a configuration and an operation of a circuit of a delay element according to the third embodiment.
Figure 10B:
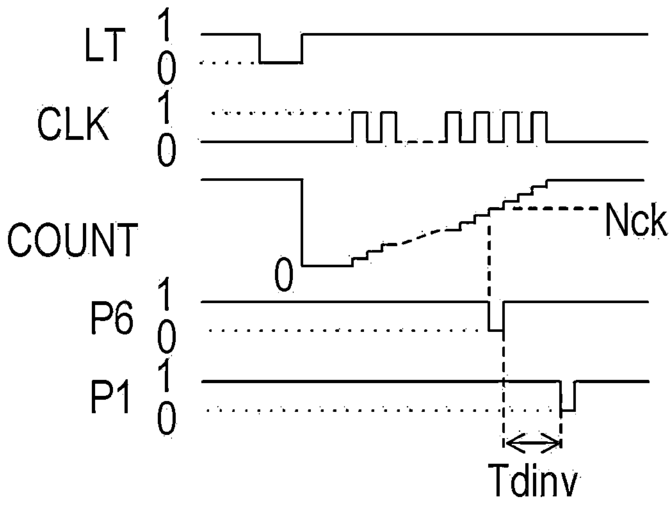

Subsequently, with reference to FIGS. 10A and 10B, a configuration and an operation of the delay element 901 will be explained. FIG. 10A is an explanatory diagram of a circuit configuration of the delay element 901. FIG. 10B is an explanatory diagram of the operation of the delay element 901.

The delay element 901 is a circuit configuration which connects the delay element 701 according to the second embodiment and the delay element 312 according to the first embodiment in series. The rise of the signal LT input from the pad 305 is delayed on the basis of the numeral value Nck and is output to a terminal P6. The signal input into the terminal P6 is transferred to a first stage of the delay element 401 constituted by serial connection of the plurality of inverters 402. By means of the delay element 401, the rise of the signal LT increases a delay amount only by time Tdinv with respect to the terminal P6. By means of the configuration as above, in the third embodiment, the delay element 901 is constituted as a logic circuit in which an output state changes with the signal LT and the signal CLK as inputs.

As described above, in the configuration of the third embodiment, too, the relation between the timing of the LT signal and the register update timing can be adjusted by delay time of the LT signal, whereby the direct timing restriction between the LT signal and the HE pulse can be relaxed. As a result, the degree of freedom in design of the HE pulse and the LT timing increases, whereby the restriction on the design of the recording element substrate can be relaxed.

Moreover, in the configuration of the third embodiment, the delay time of the signal LT can be roughly adjusted with a cycle of the signal CLK by the numeral value Nck and be finely adjusted with stage-number adjustment of the inverter. Regarding the numeral value Nck, the circuit is determined by a connection destination of the wiring and thus, dependency of the numeral value Nck and a circuit area is small. That is, in the third embodiment, fine adjustment of the delay time is made possible and the dependency of the size of the delay time and the circuit area can be made smaller than the case where the delay of the signal LT is constituted only by the inverter.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-204335, filed on Dec. 4, 2023, which is hereby incorporated by reference herein in its entirety.

What is claimed is:

1. A recording element substrate which records an image by discharging a liquid toward a recording medium, the recording element substrate comprising:

a nozzle which discharges a liquid;

an energy generating portion which generates energy for discharging a liquid from the nozzle;

a latch input terminal which inputs a latch signal;

a data input terminal which inputs a data signal for controlling a drive state of the energy generating portion;

a heat-pulse generation circuit which generates a heat-pulse signal determining a drive timing of the energy generating portion;

a latch circuit to which the data signal is input from the data input terminal and which inputs the data signal at a timing at which the latch signal is input;

a drive element to which the heat-pulse signal is input from the heat-pulse generation circuit and the data signal is input from the latch circuit, the drive element outputting a drive signal determining a drive state of the energy generating portion by a logical product of the heat-pulse signal and the data signal; and a delay circuit which delays the latch signal and inputs the same to the latch circuit.

2. The recording element substrate according to claim 1, wherein the drive element outputs the drive signal such that the energy generating portion is driven, in a case where the heat-pulse signal and the data signal are both active.

3. The recording element substrate according to claim 1, wherein the data signal is input into the drive element, in a case where the heat-pulse signal is non-active.

4. The recording element substrate according to claim 1, further comprising:

a plurality of the nozzles, wherein the energy generating portion includes heaters in the same number as that of the nozzles.

5. The recording element substrate according to claim 4, further comprising:

the drive element in the same number as that of the heaters; and a plurality of heat delay elements which delay the heat-pulse signal and input the same into the drive element, wherein timings at which the heat-pulse signal is input into the plurality of drive elements is different from each other.

6. The recording element substrate according to claim 1, further comprising:

a clock input terminal which inputs a clock signal; and a shift register to which the clock signal and the data signal are input and which inputs the data signal to the latch circuit synchronously with the clock signal.

7. The recording element substrate according to claim 1, wherein the delay circuit includes a delay element constituted by a plurality of inverter elements connected in series.

8. The recording element substrate according to claim 1, further comprising:

a clock input terminal which inputs a clock signal, wherein the delay circuit is a logic circuit whose output state changes with the latch signal and the clock signal as inputs.

9. The recording element substrate according to claim 8, wherein the delay circuit includes a counter in which a count value is increased in accordance with an input of the clock signal, and the count value is reset in accordance with an input of the latch signal.

10. The recording element substrate according to claim 9, wherein the delay circuit includes a delay element constituted by a plurality of inverter elements connected in series.

11. The recording element substrate according to claim 8, wherein the delay circuit includes a flip-flop circuit with the clock signal as an update signal.

12. A liquid discharge head comprising:

a recording element substrate which discharges a liquid toward a recording medium and records an image, wherein the recording element substrate includes:

a nozzle which discharges a liquid;

an energy generating portion which generates energy for discharging a liquid from the nozzle;

a latch input terminal which inputs a latch signal;

a data input terminal which inputs a data signal for controlling a drive state of the energy generating portion;

a heat-pulse generation circuit which generates a heat-pulse signal determining a drive timing of the energy generating portion;

a latch circuit to which the data signal is input from the data input terminal and which inputs the data signal at a timing at which the latch signal is input;

a drive element to which the heat-pulse signal is input from the heat-pulse generation circuit and the data signal is input from the latch circuit, the drive element outputting a drive signal determining a drive state of the energy generating portion by a logical product of the heat-pulse signal and the data signal; and a delay circuit which delays the latch signal and inputs the same to the latch circuit.

13. A recording device which records an image on a recording medium, comprising:

a liquid discharge head which has a recording element substrate and discharges a liquid to a recording medium, wherein the recording element substrate includes:

a nozzle which discharges a liquid;

an energy generating portion which generates energy for discharging a liquid from the nozzle;

a latch input terminal which inputs a latch signal;

a data input terminal which inputs a data signal for controlling a drive state of the energy generating portion;

a heat-pulse generation circuit which generates a heat-pulse signal determining a drive timing of the energy generating portion;

a latch circuit to which the data signal is input from the data input terminal and which inputs the data signal at a timing at which the latch signal is input;

a drive element to which the heat-pulse signal is input from the heat-pulse generation circuit and the data signal is input from the latch circuit, the drive element outputting a drive signal determining a drive state of the energy generating portion by a logical product of the heat-pulse signal and the data signal; and a delay circuit which delays the latch signal and inputs the same to the latch circuit.

* * * * *